(12) United States Patent
Zhang et al.

(10) Patent No.: US 11,997,618 B2
(45) Date of Patent: May 28, 2024

(54) PHR REPORTING FOR MULTI-BEAM PUSCH TRANSMISSIONS

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Hong He, San Jose, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 17/593,283

(22) PCT Filed: Jan. 14, 2021

(86) PCT No.: PCT/CN2021/071914
§ 371 (c)(1),
(2) Date: Sep. 14, 2021

(87) PCT Pub. No.: WO2022/151260
PCT Pub. Date: Jul. 21, 2022

(65) Prior Publication Data
US 2023/0224827 A1    Jul. 13, 2023

(51) Int. Cl.
*H04W 52/36* (2009.01)
*H04B 7/0408* (2017.01)

(52) U.S. Cl.
CPC ........ *H04W 52/365* (2013.01); *H04B 7/0408* (2013.01)

(58) Field of Classification Search
CPC ............ H04W 52/365; H04W 52/225; H04W 52/325; H04W 52/42; H04B 7/0408
(Continued)

(56) References Cited

U.S. PATENT DOCUMENTS

2018/0368081 A1 * 12/2018 Akkarakaran ...... H04W 52/365
2019/0281562 A1    9/2019 Li et al.

FOREIGN PATENT DOCUMENTS

CN    109151981    1/2019
CN    110536399    12/2019

OTHER PUBLICATIONS

Huawei et al., "Enhancements on multi-TRP for reliability and robustness in Rel-17", 3GPP TSG RAN WG1 Meeting #103-e, R1-2007587, Nov. 13, 2020, 12 sheets.
(Continued)

*Primary Examiner* — Shaima Q Aminzay
(74) *Attorney, Agent, or Firm* — Fay Kaplun & Marcin, LLP

(57) ABSTRACT

A user equipment (UE) is configured to provide a power headroom report (PHR) to a network. The UE receives a physical uplink shared channel (PUSCH) configuration from a base station of the wireless network, wherein the PUSCH configuration includes a plurality of beams over which PUSCH repetitions should be transmitted, determines at least one power headroom report (PHR) based on a power control parameter set corresponding to at least one of the plurality of beams or PUSCH repetitions and transmits the at least one PHR to the base station.

20 Claims, 4 Drawing Sheets

(58) Field of Classification Search
USPC .......................................................... 455/522
See application file for complete search history.

(56) References Cited

OTHER PUBLICATIONS

Nokia et al., "Summary of AI:8.1.2.1 Enhancements for Multi-TRP URLLC for PUCCH and PUSCH", 3GPP TSG RAN WG1 #102, R1-2007182, Aug. 28, 2020, 39 sheets.

* cited by examiner

| P | R | PH 1 |
|---|---|------|
| R | R | PH 2 |
| MPE or R | | PCMAX,f,c |

Fig. 4B

| P | C | PH |
|---|---|----|
| MPE or R | | PCMAX,f,c |

Fig. 4C

PHR REPORTING FOR MULTI-BEAM PUSCH TRANSMISSIONS

BACKGROUND

A user equipment (UE) may transmit a power headroom report (PHR) when a predetermined event (e.g., expiration of a periodic timer or a change in pathloss greater than a predetermined threshold) triggers this transmission. The PHR indicates to a base station (e.g., a g-NodeB of a 5G new radio (NR) wireless network) the headroom between a UE's current transmission power and its maximum power capability.

SUMMARY

Some exemplary embodiments are related to a processor of a user equipment (UE) configured to perform operations. The operations include receiving a physical uplink shared channel (PUSCH) configuration from a base station of the wireless network, wherein the PUSCH configuration includes a plurality of beams over which PUSCH repetitions should be transmitted, determining at least one power headroom report (PHR) based on a power control parameter set corresponding to at least one of the plurality of beams or PUSCH repetitions and transmitting the at least one PHR to the base station.

Other exemplary embodiments are related to a user equipment (UE) having a transceiver and a processor. The transceiver is configured to communicate with a wireless network. The processor is communicatively coupled to the transceiver and configured to perform operations. The operations include receiving a physical uplink shared channel (PUSCH) configuration from a base station of the wireless network, wherein the PUSCH configuration includes a plurality of beams over which PUSCH repetitions should be transmitted, determining at least one power headroom report (PHR) based on a power control parameter set corresponding to at least one of the plurality of beams or PUSCH repetitions and transmitting the at least one PHR to the base station.

BRIEF DESCRIPTION OF THE DRAWINGS

FIGS. 4A-4C show medium access control-control elements (MAC-CE) for reporting a PHR according to various exemplary embodiments.

DETAILED DESCRIPTION

Figure 1:
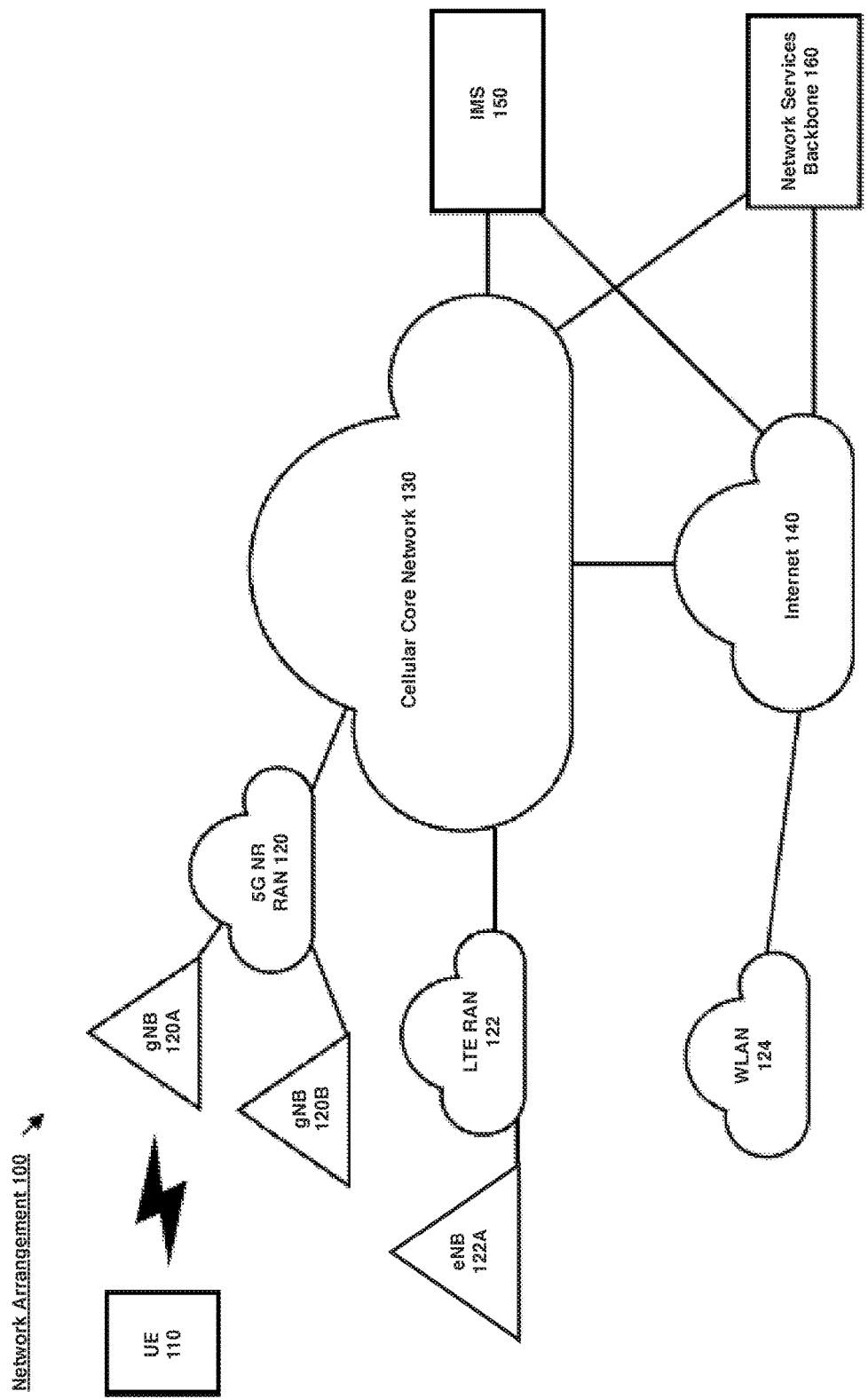
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to power headroom report (PHR) reporting by a user equipment (UE) for physical uplink shared channel (PUSCH) transmission repetitions over different beams.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio (NR) radio access technology (RAT). However, while the exemplary embodiments are described with reference to a 5G NR RAT, it should be understood that the exemplary embodiments may also be implemented for other types of networks, e.g., Long Term Evolution (LTE) networks, next generation networks, etc.

In 5G NR wireless communications, the UE may send PUSCH transmission repetitions using different beams to ensure that the transmission is received by a next generation NodeB (gNB) of the 5G NR network. Typically, the UE will send a PHR associated with a PUSCH transmission to the gNB. However, the PHR is independent of the beam used for that particular repetition. That is, the PHR for a given PUSCH transmission is the same for all repetitions. This may result in an inaccurate PHR since the power control parameters that the UE uses to send a particular repetition on one beam may differ from the parameters used to send another repetition on a second beam.

According to some exemplary embodiments, the UE determines a power headroom for a predetermined PUSCH repetition/beam and transmits a PHR based on that power headroom to the gNB of the network. The PHR may be reported using one or more medium access control-control elements (MAC-CEs).

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120 A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network.

Figure 2:
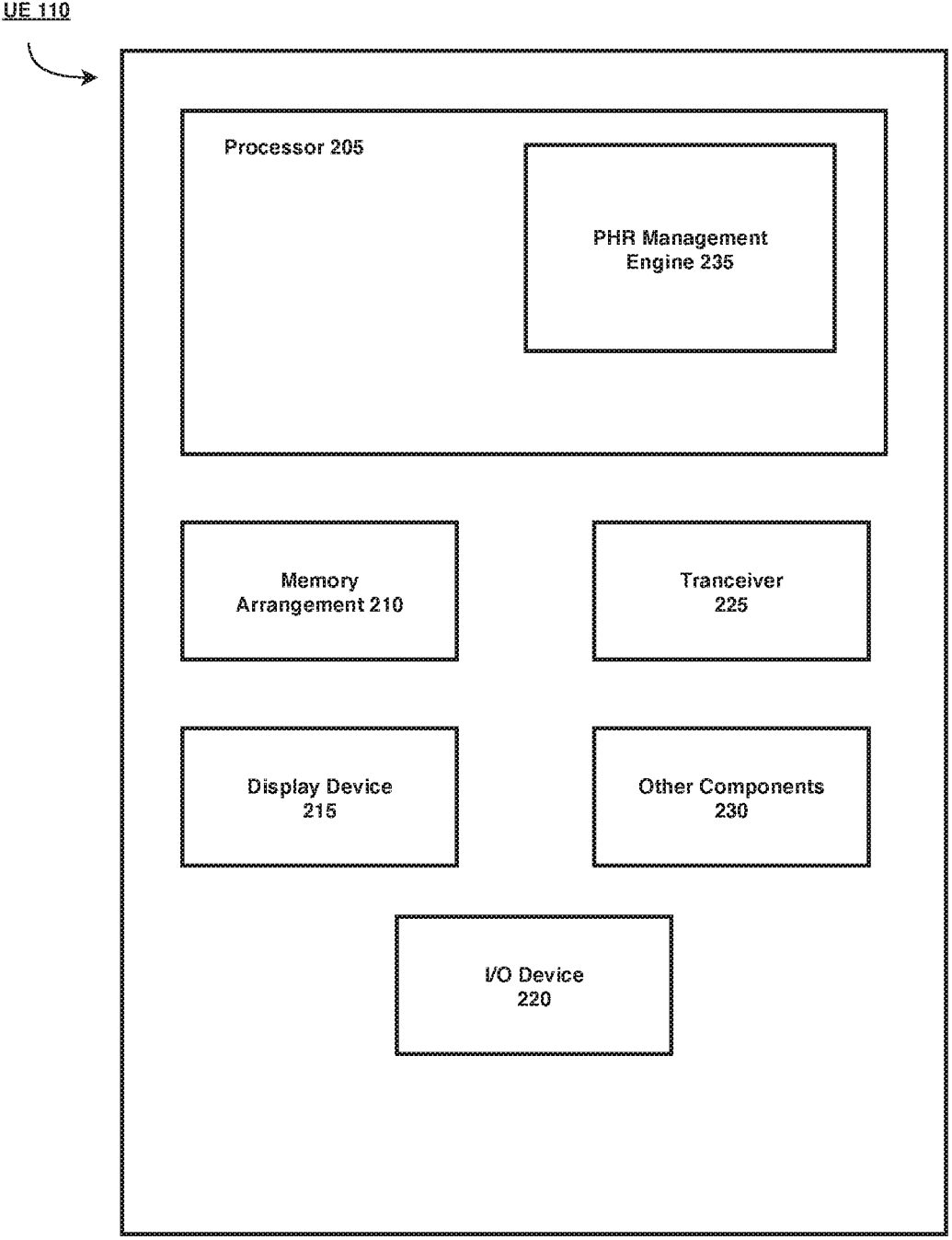
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PHR engine 235. The PHR engine 235 may perform various operations related to determining a PHR for a PUSCH repetitions or beam and transmitting the PHR to the gNB 120A (or 120B).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
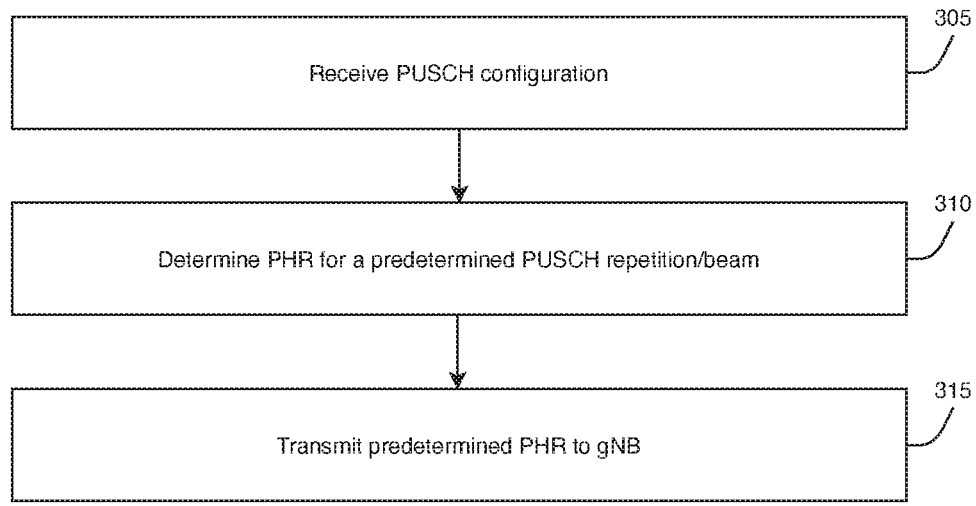
FIG. 3 shows a method of reporting a power headroom report (PHR) according to various exemplary embodiments.

FIG. 3 shows a method 300 of reporting a PHR by the UE 110 to the gNB 120A (or 120B). At 305, the UE 110 receives a PUSCH configuration from the gNB 120A which configures the UE 110 to use a plurality of beams for transmission of PUSCH repetitions. In some embodiments, the PUSCH configuration may be a downlink control information (DCI) transmission received from the gNB 120A which schedules the PUSCH repetitions. In some embodiments, the scheduling DCI may be a single DCI received from the gNB 120A. In some embodiments, the scheduling DCI may alternatively be multiple DCI transmissions (multi-DCI) received from multiple transmission and reception points (multi-TRPs) (e.g., gNB 120A and gNB 120B), each of which schedules corresponding PUSCH repetitions on a given beam.

In some embodiments, the PUSCH configuration may alternatively be a configured grant (CG) (e.g., rrc-ConfiguredUplinkGrant) that configures one PUSCH resource with multiple beams (e.g., multiple sounding reference signal resource indicators (SRIs) (srs-ResourceIndicator) or transmission configuration indicators (TCIs)) and/or multiple precoding matrix indicators (PMIs) (e.g., multiple precodingAndNumberOfLayers IEs) and/or multiple transmission configuration indicators (TCIs). In such embodiments, the gNB 120A maps PUSCH repetitions to corresponding configured beams. In some embodiments, such as, for example, in frequency range 1 (FR1), no beam indicators are provided in the CG and multiple PMI indicators are provided. In some embodiments, the PUSCH configuration may alternatively include multiple CGs (multiple rrc-ConfiguredUplinkGrants), each of which configures PUSCH repetitions on a corresponding beam.

At 310, the UE 110 determines the PHR for a PUSCH repetition/beam. In some embodiments, when the PUSCH configuration is a single scheduling DCI, the UE 110 may determine the PHR based on the power control parameters corresponding to the first beam indicated by the first sounding reference signal resource indicator (SRI) of the received DCI. In some embodiments, the UE 110 may alternatively determine the PHR based on the power control parameters corresponding to the last beam indicated by the last SRI of the received DCI. In some embodiments, the UE 110 may alternatively determine the PHR based on the power control parameters corresponding to the first PUSCH repetition. In some embodiments, the UE 110 may alternatively determine the PHR based on the power control parameters corresponding to the last PUSCH repetition. In some embodiments, the UE 110 may alternatively determine the PHR based on the power control parameters corresponding to a UE-selected PUSCH repetition. In such a scenario, the UE 110 includes the PUSCH repetition or power control parameter index with the PHR to identify to the gNB 120A which PUSCH repetition the PHR corresponds to. In some embodiments, the UE 110 may alternatively determine the power headroom based on the power control parameters for each beam and base the PHR on one of the maximum, minimum, or average power headroom among all of the beams. In some embodiments, the gNB 120A may configure the UE's PHR determination via RRC signaling or may indicate it in the scheduling DCI.

Figure 4A:
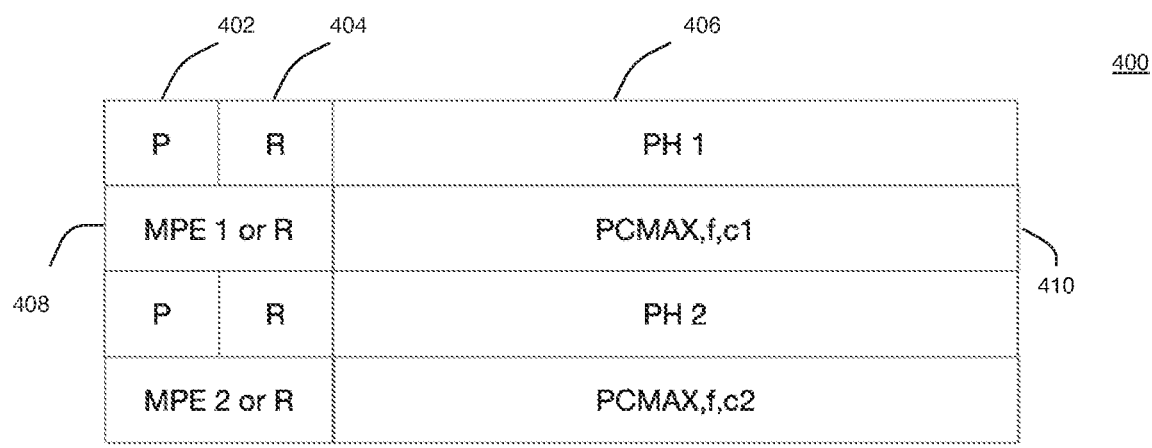

In some embodiments, when the PUSCH configuration is a single scheduling DCI, the UE 110 may alternatively determine multiple PHRs corresponding to the multiple beams carrying the PUSCH transmission repetitions. In such a scenario, the UE 110 determines a PHR based on the power control parameters corresponding to each beam. In some embodiments, the UE 110 may report the multiple PHRs in one MAC CE 400, as depicted in FIG. 4A. As shown in FIG. 4A, each PHR entry in the MAC CE 400 includes a power back off field 402 (indicated by "P"), a reserved field 404 (indicated by "R"), a power headroom field 406 (PH1 for the first PHR, PH2 for the second PHR), a maximum permissible exposure (MPE) and/or reserved field 408 (MPE1 for first PHR, MPE2 for second PHR), and a maximum configured UE transmission power (PCMAX) field for carrier f of serving cell c (c1 for the first PHR, c2 for the second PHR) in a PUSCH transmission occasion (e.g., 1, 2, etc.). In some embodiments, to reduce overhead, the PHRs may be reported as a first baseline PHR (e.g., PH1) and differential PHRs (e.g., PH2) that indicate the difference between the corresponding PHR and the first baseline PHR.

In some embodiments, if the PCMAX is the same for the PHRs, the UE 110 may use a MAC CE 420, as depicted in FIG. 4B. MAC CE 420 is substantially similar to MAC CE 400 with the exception of the first field of the second octet being a reserved field and only one instance of an MPE or R field and a PCMAX field. In some embodiments, the UE 110 may alternatively report the multiple PHRs in corresponding multiple MAC CEs 440, as depicted in FIG. 4C. MAC CE 440 is similar to the MAC CEs discussed above with the exception of an indicator field (C) that indicates which power control set (beam) the PHR corresponds to.

In some embodiments, when the PUSCH configuration at 305 is a multi-DCI scheduling, the UE 110 determines the PHR based on PUSCH repetition(s) triggered by one of the multiple DCIs. In some embodiments, the selection of the one DCI may be based on the control resource set (CORESET) or search space (SS) ID. For example, the UE 110 may select the DCI with the lowest CORESET/SS ID. In some embodiments, the selection of the one DCI may alternatively be based on the DCI's symbol/slot index. For example, the UE 110 may select the earliest DCI. In some embodiments, the UE 110 may alternatively base the PHR on power control parameters of the first PUSCH repetition. In some embodiments, the UE 110 may alternatively base the PHR on power control parameters of the last PUSCH repetition. In some embodiments, the UE 110 may alternatively base the PHR on a UE-selected PUSCH repetition. In such a scenario, the UE 110 reports the PUSCH repetition or power control parameters index corresponding to the gNB 120A for the corresponding PHR. In some embodiments, the UE 110 may alternatively determine the power headroom based on the power control parameters for each beam and base the PHR on one of the maximum, minimum, or average power headroom among all of the beams. In some embodiments, the gNB 120A may configure the UE's PHR determination via RRC signaling or may indicate it in the scheduling DCI.

In some embodiments, when the PUSCH configuration at 305 is a multi-DCI scheduling, the UE 110 determines multiple PHRs corresponding to the multiple beams. In such a scenario, each PHR is determined based on the PUSCH repetition scheduled by each DCI. In such a scenario, the UE 110 may report the multiple PHRs as explained above with respect to MAC CEs 400, 420, and 440.

In some embodiments, the reporting of a single PHR or multiple PHRs (for both single DCI and multi-DCI scheduling) may be configured by the gNB 120A via RRC signaling. In some embodiments, the reporting of a single PHR or multiple PHRs may alternatively be based on UE capability, which the UE 110 reports to the gNB 120A. In some embodiments, the UE 110 does not report a PHR for a single-DCI scheduled PUSCH transmission over multiple beams. In some embodiments, the UE 110 does not report a PHR for a multi-DCI scheduled PUSCH transmission over multiple beams.

In some embodiments, when the PUSCH configuration is a CG, the UE 110 determines one or more PHRs at 310 in a similar manner as explained above with respect to the single scheduling DCI. In some embodiments, when the PUSCH configuration includes multiple CGs, the UE 110 may determine one or more PHRs at 310 in a similar manner as explained above with respect to the multi-DCI scheduling. In such a scenario, a time window may be defined to identify PUSCH resources in the CG as repetitions. For example, the time window may begin when a PUSCH is transmitted based on the PUSCH resource configured in a first CG and end at the last symbol of a PUSCH transmitted based on the PUSCH resource configured in a second CG. In some embodiments, the UE 110 transmits at least the PUSCH associated with the PHR determined at 310.

At 315, the UE 110 transmits the PHR to the gNB 120A. In some embodiments, the determination of a PHR as explained above may be an actual PHR (a PHR based on power control parameters of an actual PUSCH transmission).

In some embodiments, the determination of a PHR may be a virtual PHR (a PHR based on power control parameters configured for a PUSCH transmission). In some embodiments, the gNB 120A may configure the UE 110 to determine one or more virtual PHRs. In some embodiments, the UE 110 may report to the gNB 120A whether or not it supports virtual PHR reporting when it reports it capability. To facilitate the determination of virtual PHRs, the gNB 120A may configure the UE 110 with multiple power control parameters for virtual PUSCH transmissions. In such a scenario, the UE 110 may utilize the MAC CEs 400, 420, and 440 discussed above to report multiple PHRs to the gNB 120A. In some embodiments, the gNB 120A may configure the UE 110 with multiple virtual power control parameters for determination of a single PHR. In such a scenario, the UE 110 may determine the PHR based on an average, minimum, or maximum power headroom.

Examples

In a first example, a user equipment (UE) comprising a transceiver configured to communicate with a wireless network and a processor communicatively coupled to the transceiver and configured to perform operations is provided. The operations comprise receiving a physical uplink shared channel (PUSCH) configuration from a base station of the wireless network, wherein the PUSCH configuration includes a plurality of beams over which PUSCH repetitions should be transmitted, determining at least one power headroom report (PHR) based on a power control parameter set corresponding to at least one of the plurality of beams or PUSCH repetitions and transmitting the at least one PHR to the base station.

In a second example, the UE of the first example, wherein the PUSCH configuration includes one of (a) a single downlink control information (DCI) transmission that schedules transmission of the PUSCH repetitions over the plurality of beams or (b) a single configured grant (CG) transmission including at least one of multiple beam indicators and multiple precoding matrix indicators (PMIs) to configure the plurality of beams for PUSCH repetition transmission.

In a third example, the UE of the second example, wherein the at least one PHR is one PHR based on the power control parameter set corresponding to a predetermined one of the plurality of beams or PUSCH repetitions.

In a fourth example, the UE of the third example, wherein the one PHR is based on the power control parameter set corresponding to a first beam of the plurality of beams.

In a fifth example, the UE of the third example, wherein the one PHR is based on the power control parameter set corresponding to a last beam of the plurality of beams.

In a sixth example, the UE of the third example, wherein the one PHR is based on the power control parameter set corresponding to a first repetition of the PUSCH repetitions.

In a seventh example, the UE of the third example, wherein the one PHR is based on the power control parameter set corresponding to a last repetition of the PUSCH repetitions.

In a eighth example, the UE of the third example, wherein the one PHR is based on the power control parameter set corresponding to a UE-selected PUSCH repetition, and wherein the operations further comprise transmitting one of a PUSCH repetition index or a power control parameter set index corresponding to the UE-selected PUSCH repetition to the base station together with the PHR.

In a ninth example, the UE of the second example, wherein the operations further comprise determining a plurality of PHRs based on the power control parameter sets of the plurality of beams, wherein the at least one PHR is one PHR based on one of a minimum, maximum, or average of the plurality of PHRs.

In a tenth example, the UE of the second example, wherein the at least one PHR includes a plurality of PHRs based on the power control parameter set corresponding to each of the plurality of beams or PUSCH repetitions.

In an eleventh example, the UE of the tenth example, wherein the plurality of PHRs are reported using (a) one medium access control-control element (MAC CE) transmission, or (b) a plurality of MAC CE transmissions corresponding to the plurality of PHRs.

In a twelfth example, the UE of the eleventh example, wherein when the plurality of PHRs are reported using the plurality of MAC CE transmissions, each MAC CE transmission includes an indicator field indicating to which PUSCH repetition, power control parameter set, or beam the MAC CE corresponds.

In a thirteenth example, the UE of the first example, wherein the PUSCH configuration includes one of (a) multiple DCI transmissions, each of which schedules PUSCH repetitions on a respective beam or (b) multiple CG transmissions, each of which schedules PUSCH repetitions over a respective beam.

In a fourteenth example, the UE of the thirteenth example, wherein the at least one PHR is one PHR based on PUSCH repetitions triggered by one DCI from the multiple DCI transmissions or one CG from the multiple CG transmissions.

In a fifteenth example, the UE of the fourteenth example, wherein the one DCI is selected based on a control resource set (CORESET) ID or a search space (SS) ID.

In a sixteenth example, the UE of the fourteenth example, wherein the one DCI or one CG is selected based on a symbol index or a slot index.

In a seventeenth example, the UE of the fourteenth example, wherein the one PHR is based on the power control parameter set corresponding to one of (a) a first repetition of the PUSCH repetitions or (b) a last repetition of the PUSCH repetitions.

In a eighteenth example, the UE of the fourteenth example, wherein the one PHR is based on the power control parameter set corresponding to a UE-selected PUSCH repetition, and wherein the operations further comprise transmitting one of a PUSCH repetition index or a power control parameter set index corresponding to the UE-selected PUSCH repetition to the base station together with the PHR.

In a nineteenth example, the UE of the thirteenth example, wherein the operations further comprise determining a plurality of PHRs based on the power control parameter sets of the plurality of beams, wherein the at least one PHR is one PHR based on one of a minimum, maximum, or average of the plurality of PHRs.

In a twentieth example, the UE of the thirteenth example, wherein the at least one PHR includes a plurality of PHRs, each of which is based on the power control parameter set corresponding to each PUSCH repetition scheduled by one of the multiple DCI transmissions.

In a twenty first example, the UE of the first example, wherein the at least one PHR includes a plurality of PHRs, wherein the plurality of PHRs are reported using one MAC CE transmission, and wherein each PHR reporting of the one MAC CE transmission comprises: a first octet having (a) a power back off field (P), (b) a reserved field (R), and (c) a power headroom field ($PH_i$) and a second octet having (a) at least one of a maximum permissible exposure ($MPE_i$) field and a reserved field (R) and (b) a maximum configured UE transmission power field (PCMAX).

In a twenty second example, the UE of the first example, wherein the at least one PHR includes a plurality of PHRs, and wherein the plurality of PHRs are reported using a plurality of MAC CE transmissions corresponding to the plurality of PHRs.

In a twenty third example, the UE of the twenty second example, wherein when the plurality of PHRs are reported using the plurality of MAC CE transmissions, each MAC CE transmission includes field indicating to which PUSCH repetition, power control parameter set, or beam the MAC CE corresponds.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
    receiving a physical uplink shared channel (PUSCH) configuration from a base station of a wireless network, wherein the PUSCH configuration includes a plurality of beams over which PUSCH repetitions are to be transmitted, wherein the PUSCH configuration includes a single downlink control information (DCI) transmission that schedules transmission of the PUSCH repetitions over the plurality of beams;
    determining at least one power headroom report (PHR) based on a power control parameter set corresponding to at least one of the plurality of beams or PUSCH repetitions; and
    transmitting the at least one PHR to the base station.

2. The processor of claim 1, wherein the at least one PHR is one PHR based on the power control parameter set corresponding to a predetermined one of the plurality of beams or PUSCH repetitions.

3. The processor of claim 2, wherein the one PHR is based on the power control parameter set corresponding to a UE-selected PUSCH repetition, and wherein the operations further comprise:
    transmitting one of a PUSCH repetition index or a power control parameter set index corresponding to the UE-selected PUSCH repetition to the base station together with the PHR.

4. The processor of claim 1, wherein the operations further comprise:
    deter mining a plurality of PHRs based on the power control parameter sets of the plurality of beams,
    wherein the at least one PHR is one PHR based on one of a minimum, maximum, or average of the plurality of PHRs.

5. The processor of claim 1, wherein the at least one PHR includes a plurality of PHRs based on the power control parameter set corresponding to each of the plurality of beams or PUSCH repetitions.

6. The processor of claim 1, wherein the PUSCH configuration further includes multiple CG transmissions, each of which schedules PUSCH repetitions over a respective beam.

7. The processor of claim 6, wherein the at least one PHR is one PHR based on PUSCH repetitions triggered by one DCI from the multiple DCI transmissions or one CG from the multiple CG transmissions.

8. The processor of claim 6, wherein the operations further compise:
    determining a plurality of PHRs based on the power control parameter sets of the plurality of beams,
    wherein the at least one PHR is one PHR based on one of a minimum, maximum, or average of the plurality of PHRs.

9. The processor of claim 1, wherein the at least one PHR includes a plurality of PHRs, wherein the plurality of PHRs are reported using one MAC CE transmission, and wherein each PHR reporting of the one MAC CE transmission comprises:
    a first octet having (a) a power back off field (P), (b) a reserved field (R), and (c) a power headroom field (PH); and
    a second octet having (a) at least one of a maximum permissible exposure ($MPE_i$) field and a reserved field (R) and (b) a maximum configured UE transmission power field (PCMAX).

10. The processor of claim 1, wherein the at least one PHR includes a plurality of PHRs, and wherein the plurality of PHRs are reported using a plurality of MAC CE transmissions corresponding to the plurality of PHRs.

11. The processor of claim 10, wherein when the plurality of PHRs are reported using the plurality of MAC CE transmissions, each MAC CE transmission includes field indicating to which PUSCH repetition, power control parameter set, or beam the MAC CE corresponds.

12. A user equipment (UE), comprising:
    a transceiver configured to communicate with a wireless network; and
        a processor communicatively coupled to the transceiver and configured to perform operations comprising:
            receiving a physical uplink shared channel (PUSCH) configuration from a base station of the wireless network, wherein the PUSCH configuration includes a plurality of beams over which PUSCH repetitions are to be transmitted, wherein the PUSCH configuration includes multiple DCI transmissions, each of which schedules PUSCH repetitions on a respective beam;
            determining at least one power headroom report (PHR) based on a power control parameter set corresponding to at least one of the plurality of beams or PUSCH repetitions; and
            transmitting the at least one PHR to the base station.

13. The UE of claim 12, wherein the PUSCH configuration further includes a single configured grant (CG) transmission including at least one of multiple beam indicators and multiple precoding matrix indicators (PMIS) to configure the plurality of beams for PUSCH repetition transmission.

14. The UE of claim 13, wherein the at least one PHR includes a plurality of PHRs based on the power control parameter set corresponding to each of the plurality of beams or PUSCH repetitions.

15. The UE of claim 14, wherein the plurality of PHRs are reported using (a) one medium access control-control element (MAC CE) transmission, or (b) a plurality of MAC CE transmissions corresponding to the plurality of PHRs.

16. The UE of claim 12, wherein the operations further comprise:
   determining a plurality of PHRs based on the power control parameter sets of the plurality of beams,
   wherein the at least one PHR is one PHR based on one of a minimum, maximum, or average of the plurality of PHRs.

17. The UE of claim 12, wherein the at least one PHR includes a plurality of PHRs, wherein the plurality of PHRs are reported using one MAC CE transmission, and wherein each PHR reporting of the one MAC CE transmission comprises:
   a first octet having (a) a power back off field (P), (b) a reserved field (R), and (c) a power headroom field ($PH_i$); and
   a second octet having (a) at least one of a maximum permissible exposure ($MPE_i$) field and a reserved field (R) and (b) a maximum configured UE transmission power field (PCMAX).

18. The UE of claim 12, wherein the at least one PHR includes a plurality of PHRs, and wherein the plurality of PHRs are reported using a plurality of MAC CE transmissions corresponding to the plurality of PHRs.

19. A user equipment (UE), comprising:
   a transceiver configured to communicate with a wireless network; and
   a processor communicatively coupled to the transceiver and configured to perform operations comprising:
      receiving a physical uplink shared channel (PUSCH) configuration from a base station of the wireless network, wherein the PUSCH configuration includes a plurality of beams over which PUSCH repetitions should be transmitted, wherein the PUSCH configuration includes a single downlink control information (DCI) transmission that schedules transmission of the PUSCH repetitions over the plurality of beams;
      determining at least one power headroom report (PHR) based on a power control parameter set corresponding to at least one of the plurality of beams or PUSCH repetitions; and
      transmitting the at least one PHR to the base station.

20. A processor of a user equipment (UE) configured to perform operations comprising:
   receiving a physical uplink shared channel (PUSCH) configuration from a base station of the wireless network, wherein the PUSCH configuration includes a plurality of beams over which PUSCH repetitions should be transmitted, wherein the PUSCH configuration includes one of (a) multiple DCI transmissions, each of which schedules PUSCH repetitions on a respective beam or (b) multiple CG transmissions, each of which schedules PUSCH repetitions over a respective beam;
   determining at least one power headroom report (PHR) based on a power control parameter set corresponding to at least one of the plurality of beams or PUSCH repetitions; and
   transmitting the at least one PHR to the base station.

* * * * *